Jan. 18, 1955     H. C. WHITE     2,700,054
ISOLATION OF AMINO ACIDS
Filed April 6, 1950
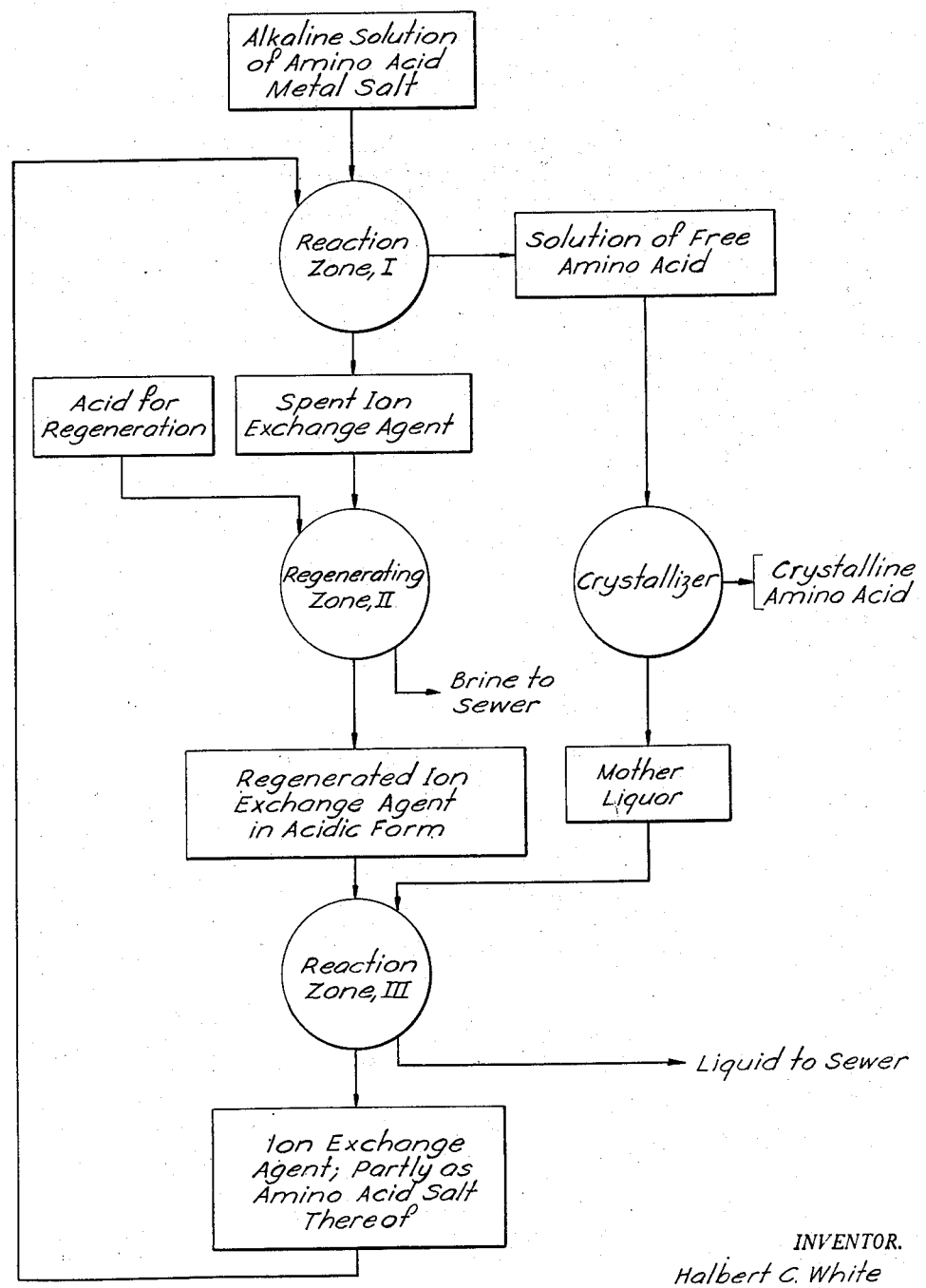
INVENTOR.
Halbert C. White
BY
*Griswold & Burdick*
ATTORNEYS

United States Patent Office 2,700,054
Patented Jan. 18, 1955

2,700,054

ISOLATION OF AMINO ACIDS

Halbert C. White, Midland, Mich., assignor to The Dow Chemical Company, Midland, Mich., a corporation of Delaware Application April 6, 1950, Serial No. 154,345

12 Claims. (Cl. 260—534)

This invention concerns an improved method for separating amino acids in free form from alkaline aqueous solutions of salts of the same.

In the production of amino acids synthetically or from proteinic starting materials, there frequently are obtained aqueous solutions of metal salts of the amino acids. Such solutions are alkaline, e. g. of pH of 9 or above, due both to the alkalinity of the amino acid salt in water and to the fact that other soluble basic compounds often are present. In most, if not all, instances such solution also contains water-soluble inorganic salts such as chlorides, sulphates, carbonates, or bicarbonates of sodium or potassium, etc. For instance, in the hydrolysis, with sodium hydroxide, of hydantoin, or hydantoin derivatives having organic substituents in the 5-position, there is obtained a hydrolysis liquor containing a sodium salt of the corresponding alpha-amino monocarboxylic acid, unconsumed alkali, sodium carbonate or bicarbonate, and frequently minor amounts of other soluble inorganic salts such as sodium chloride, or sodium sulphate, etc., present as impurities in one or more of the starting materials employed.

Heretofore, recovery of the free amino acid in a form of good purity from such alkaline aqueous solution of the amino acid salt has been difficult and expensive. For instance, one known method involves acidification of the solution, e. g. with hydrochloric acid, evaporation of the mixture to dryness under vacuum, extraction of the hydrochloride of the amino acid from the residue with absolute alcohol, and a series of subsequent steps for purification and liberation of the amino acid in free form. Because of the kind and number of steps involved, the method is not well adapted to commercial practice.

It is an object of this invention to provide a relatively simple and inexpensive method for separating aliphatic alpha-amino monocarboxylic acids from alkaline aqueous solutions of salts of the same. Other objects will be evident from the description of the invention, as hereinafter presented.

Before describing the invention, mention may be made of U. S. Patent 2,462,597 which discloses a method different from, but somewhat related to, that of the invention. The patent discloses that polyamino acids may be separated from monoamino acids by passing an aqueous solution of the mixture of acids through a bed of a cation exchange agent in its acidic form until the polyamino acid starts to appear in the effluent liquor. At this point in the process, the polyamino acid is largely absorbed in the bed and monoamino acid is in the effluent liquor. Thereafter the polyamino acid is flushed from the bed, e. g. with an aqueous ammonia solution. The patent cautions that the solution of amino acids fed to the bed must be free of metal cations in order to avoid difficulties in subsequent steps for purification of the amino acids. Accordingly, the method of the patent is not adapted to the purpose of the present invention. The patent is mentioned because it approaches the invention more closely than any other known art.

I have found that by treating an alkaline aqueous solution, e. g. having a pH value of 9 or higher, of a metal salt of an aliphatic alpha-amino monocarboxylic acid with the acidic form of a water-insoluble cation exchange agent in amount sufficient to bring the solution to a pH value of from 4.5 to 8.5, the metal cations are selectively absorbed from the solution by the cation exchange agent, i. e. to form a salt of said agent, leaving a major portion, or all, of the amino acid in free form and capable of being crystallized, or otherwise separated, directly from the aqueous liquor.

I have further found that the alkaline solution of the salt of the amino acid may, and often with advantage, be at above room temperature, e. g. at between 60° C. and its boiling temperature, when admixed with the cation exchange agent, and of a concentration such that the amino acid, which is liberated from its salt by action of said agent, remains dissolved in the warm, or hot, liquor, but may be crystallized therefrom by subsequent cooling of the liquor. I have also found that the portion of the amino acid remaining dissolved in the mother liquor from the crystallization may be recovered by contacting the mother liquor with the acidic form, i. e. the regenerated hydrogen-form, of the cation exchange agent, whereby the amino acid is chemically absorbed by the agent to form a salt of the latter. The thus-treated ion exchange agent may then be employed to treat a further batch of the heated alkaline aqueous solution of a metal salt of an amino acid, whereby the amino acid previously absorbed by the agent is displaced by metal ions from the neutral to alkaline salt solution and the latter is simultaneously freed of dissolved metal ions and enriched in the amino acid in free form. The amino acid may be crystallized by cooling the treated liquor. This combination of steps permits excellent separation of the free amino acid in crystalline form without need for evaporating the liquor from which it is being recovered.

The accompanying drawing is a flow sheet illustrating a preferred sequence of steps for practice of the process. The steps shown are advantageously employed in either a batchwise or continuous mode of operation, but the movement of ion exchange material through a cycle of zones pertains especially to continuous operation. When operating batchwise the ion exchange agent may be transferred from one zone to another, as indicated in the drawing, but is usually maintained in a single zone and the materials to be contacted therewith are fed successively to the zone. The steps indicated in the drawing are those preferably employed subsequent to initial use of the cation exchange material, i. e. the drawing omits an initial step of treating the cation exchange material directly with a solution of a salt of an amino acid since such step is usually not repeated (although it may be) in subsequent stages of operation. The drawing is self-explanatory and the kind and order of steps preferably employed in practice of the invention will be evident therefrom. If desired, the steps can be changed in order, or steps may be added or omitted, as hereinafter explained.

Any alpha-amino monocarboxylic acid may be recovered from an alkaline solution of a metal salt of the same by the method of the invention, but the advantages of the method and the convenience with which it may be applied are dependent in part on the solubility characteristics in water of the amino acids to be recovered. Among the various amino acids which may be recovered by the method are glycine, alanine, leucine, isoleucine, methionine, valine, lysine, tryptophane, etc.

The invention is most advantageously applied in recovering amino acids which are appreciably soluble, e. g. of 1 per cent by weight solubility or higher, in water at room temperature, since complete recovery of such amino acids by other methods, e. g. by acidification of the liquor to precipitate the amino acid, is difficult. The invention is conveniently applied for recovery from alkaline liquors of amino acids which are fairly soluble, e. g. of at least 5 per cent solubility, in boiling water. It is most conveniently applied for such recovery of amino acids which are fairly soluble in hot water, but of only limited solubility, e. g. 4 per cent solubility or less, in water at 20° C. or lower.

In order to avoid precipitation of the crystalline amino acid in admixture with the cation exchange agent during the step of treating a solution of the amino acid salt with such agent, it is necessary that water be present in amount and at a temperature such as to dissolve the amino acid as it is liberated from such salt. Otherwise, extra steps are required for extracting or otherwise separating the amino acid from the ion exchange material. On the other hand, it frequently is desirable, although not essential, that the amino acid solution produced by the treatment with the ion exchange material be of a temperature and concentration such that a considerable part of the amino acid may be crystallized directly therefrom merely by cooling the solution. Otherwise, extra steps, e. g. of concentrating the solution by evaporation, of adding an agent to throw the amino acid out of solution, or of extracting, or otherwise recovering, the dissolved amino acid from the solution and required.

In most instances, the solubility of amino acids in water increases markedly with rise in the temperature. Amino acids such as glycine, alanine, or valine, etc., capable of being dissolved in boiling water, e. g. at 100° C., to form solutions of 5 per cent by weight concentration or higher, may readily be recovered from neutral to alkaline aqueous solutions of their metal salts by the method of the invention, and amino acids which are less soluble, or even substantially insoluble in hot water can, though less conveniently, be recovered by the method. Prior to being contacted with the ion exchange agent, an alkaline solution of a salt of an amino acid which, in free form, is only slightly soluble in water at room temperature may advantageously be heated, e. g. to a temperature of from 60° to 100° C., and brought to a concentration such that the free amino acid, liberated from the salt, remains dissolved in the liquor while warm, but may be crystallized therefrom merely by cooling the solution to room temperature or below. However, it is not essential that the amino acid salt solution be at the temperature and concentration just recommended when contacted with the cation exchange agent and there are instances in which there is little advantage in employing such conditions. The amino acid salt solution may be at any temperature above its freezing point, e. g. at room temperature, and of any desired concentration when contacted with the cation exchange material. The amino acid need not be crystallized by cooling of the treated liquor, but may be recovered from the liquor in other ways, e. g. by adding an alcohol to cause precipitation of the amino acid.

Any cation exchange agent containing strongly acidic groups may be used in the process and a wide variety of suitable cation exchange materials are well known. All such agents are substantially insoluble in the media in which they are employed, e. g. in aqueous media, and they remain insoluble both when in acidic form and when in salt form. In general, ion exchange agents containing sulphonate, or sulphonic acid, radicals are preferred. Examples of such agents are sulphonated phenol-formaldehyde resins, sulphonated copolymers of monovinyl- and polyvinyl-aromatic hydrocarbons, etc. Sulphonated copolymers of styrene and divinylbenzene, or of styrene, ethylvinylbenzene and divinylbenzene are especially well adapted for use in the process.

The alkaline aqueous amino acid salt solution from which the amino acid is to be recovered may contain any water-soluble metal salt of the amino acid. It may also contain soluble metal salts of acids as weak, or weaker, than acetic acid in any concentration, since such acids when liberated from their salts do not react extensively with the amino acid or interfere seriously with separation of the latter. Thus, the alkaline amino acid salt solution may contain other dissolved salts such as sodium carbonate, sodium bicarbonate, potassium carbonate, potassium bicarbonate, or sodium acetate, etc. During neutralization of the solution with an acidic cation exchange agent, a carbonate or bicarbonate, if present in considerable amount and concentration, decomposes with evolution of carbon dioxide. The alkaline amino acid salt solution may also contain a minor amount of one or more water-soluble metal salts of strong acids, e. g. salts such as NaCl, KCl, $Na_2SO_4$, or $K_2SO_4$, etc., but the total amount of such salts should not exceed 10, and is preferably less than 5, per cent of the weight of the amino acid salt.

In practice of the method in batchwise manner, an alkaline solution of a metal salt of an alpha-amino monocarboxylic acid, which solution has a pH value of 9 or higher, is treated with an acidic form of a cation exchange agent in amount such as to bring the liquor to a pH value between 4.5 and 8.5, preferably from 7 to 8. The liquor may be at any desired temperature, e. g. between its freezing point and boiling point, when contacted with the ion exchange agent and may also be of any desired concentration. When recovering amino acids of quite low solubility in water at room temperature, e. g. having a solubility in the order of from 1 to 4 per cent at such temperature, the amino acid salt solution is advantageously of higher amino acid content than just stated and is heated prior to contact with the cation exchange agent so as to produce a liquor from which the amino acid may be crystallized merely by cooling. When the amino acid to be recovered is more soluble in water at room temperature, e. g. when its solubility is such as to form a solution of 10 weight per cent concentration or higher at room temperature, there is less advantage in being able to crystallize amino acid by cooling of the liquor after treatment with the cation exchange material. In such instance, the amino acid salt solution is usually not heated prior to treatment with the cation exchange material. Instead, the liquor resulting from such treatment is concentrated by evaporation, if necessary, and is then diluted with a water-miscible non-solvent for the amino acid, preferably with a lower aliphatic monohydric alcohol such as methanol, ethanol or propanol, etc., to throw the amino acid out of solution and the crystalline product is separated, e. g. by decanting or filtering the mixture. Alcohol is distilled and recovered from the liquor. The aqueous mother liquor obtained in either of the ways just given, i. e. by direct crystallization of amino acid from the aqueous solution resulting from the treatment with the ion exchange agent or by treating such solution with alcohol to precipitate the amino acid and subsequently distilling alcohol from the liquor, usually retains a portion of the amino acid in solution and is set aside for treatment in a subsequent stage of the process.

In the above step of treating the alkaline amino acid salt solution with an acidic form of a cation exchange agent, the latter is converted largely, or entirely, into one or more metal salts thereof. Said agent is subsequently treated in usual manner with an aqueous acid, e. g. with a dilute aqueous solution of hydrochloric or sulphuric acid, etc., to reconvert it to the acid form and excess soluble acid is washed from the regenerated agent with water.

The aqueous mother liquor from the amino acid crystallization step is admixed with, or passed through a bed of, the regenerated acidic cation exchange agent, whereby any amino acid in the liquor is chemically absorbed by the cation exchange agent and the latter is converted, at least in part, to the amino acid salt of the agent. The water remaining after this treatment is discarded.

After thus being converted, at least in part, to its amino acid salt, the cation exchange agent is admixed with a further batch of the alkaline solution of an amino acid salt in amount such as to bring the solution to a pH value of from 4.5 to 8.5. Except for the fact that the cation exchange agent is partially in the form of an amino acid salt thereof at the start of this step, the step corresponds to the first of the foregoing series of steps and the comments which have been made, as to the temperatures and concentrations at which various amino acid salt solutions may most advantageously be subjected to the treatment, apply. During this step, the amino acid, previously absorbed from mother liquor by the ion exchange agent with formation of the amino acid salt of the agent, is displaced from the agent by metal ions absorbed from the amino acid salt solution with a result that the liquor is enriched in amino acid and the amino acid initially present as a soluble salt in the liquor is liberated from its salt. The amino acid is then crystallized or precipitated from the liquor as hereinbefore described.

Except for omission of the foregoing step of first admixing an acidic form of cation exchange agent with an alkaline amino acid salt solution, the series of steps just described corresponds to that shown in the drawing. After such initial use of the cation exchange material, the process may be practiced in continuous manner by cyclic movement of the cation exchange agent through the series of zones shown in the drawing. During recycling of said agent through the zones, an alkaline amino acid salt solution may be fed continuously to reaction zone I; acid regenerating solution, e. g. a dilute aqueous solution of hydrochloric or sulphuric acid, may be fed continuously to regenerating zone II; and mother liquor from the crystallization step may be fed to reaction zone III; effluent liquors being discharged from the system at the points indicated in the drawing. The relative rates of flow of amino acid salt solution and of cation exchange material to zone I should, of course, be such as to bring the solution to a pH value between 4.5 and 8.5. Thereafter the cation exchange agent is removed from the liquor, in conventional manner, e. g. by filtering or centrifuging, and washed free of adhering amino acid solution with water. The washings are preferably added to the mother liquor flowing from the crystallization step. Such addition of the washings to the mother liquor is desirable, but not essential, and is omitted from the drawing. Crystallization of amino acid from the liquor flowing from zone I may be effected in any of the ways hereinbefore described., e. g. by cooling in some instances and by diluting with alcohol or other non-solvent for the amino acid in others. When alcohol is added to cause precipitation of the amino acid, a step, not shown in the drawing, of distilling alcohol from the mother liquor is added to the process.

The process, as hereinbefore described, may be altered without departing from the invention. For instance, after admixing the acidic cation exchange agent with the alkaline amino acid salt solution to bring the solution to a pH value of from 4.5 to 8.5 and thus liberate the amino acid from its salt, the cation exchange agent may be regenerated by treatment with an aqueous acid in conventional manner and be re-employed directly for treatment of a further amount of the amino acid salt solution. Such procedure results in a small loss of amino acid, but is operable for recovery of the free amino acid in good yield. Also, when the alkaline amino acid salt solution is neutralized to a pH value between 4.5 and 7 by treatment with an acidic cation exchange agent, a minor amount of the amino acid sometimes reacts with the ion exchange agent to form a salt of the latter. It may be displaced from said agent by treating the latter with aqueous ammonia or with a further amount of the alkaline amino acid salt solution. The amino acid may be recovered from the resultant liquor by crystallization, ammonia first being distilled off, if present. Other ways in which the process may be modified will be evident.

The following examples described certain ways in which the invention has been applied, but are not to be construed as limiting its scope.

*Example 1*

A mixture of 100 cc. of water and 200 grams of a granular cation exchange agent in its acidic form was heated to 80°–90° C. The cation exchange agent was a sulphonated copolymer of styrene, ar-ethyl-vinylbenzene, and divinylbenzene. An aqueous liquor obtained by the hydrolysis of 5-(beta-methylmercaptoethyl) hydantoin with an aqueous sodium hydroxide solution, and which contained the sodium salt of dl-methionine in amount corresponding to 10.2 grams of free methionine per 100 cc. of the solution, and also containing unreacted sodium hydroxide, sodium carbonate, and minor amounts of other soluble inorganic salts, e. g. sodium chloride, was added with stirring to the aqueous slurry of the cation exchange agent until the reaction liquor was brought to a pH value of 7. The mixture was filtered while hot, e. g. at temperatures between 80° and 90° C. or thereabout. The filtrate was cooled to 10° C. or slightly lower and methionine, thus crystallized, was removed by filtration. The cation exchange agent was washed with 250 cc. of an ammonium hydroxide solution of 5 weight per cent concentration, after which ammonia was vaporized from the washings and the latter reserved for further use in the process. The cation exchange agent was regenerated by treatment with a dilute aqueous hydrochloric acid solution and washed with water. Another batch of the alkaline liquor, obtained by hydrolysis of 5-(beta-methylmercaptoethyl) hydantoin and corresponding in amount and concentration with that first employed, was admixed with the above-mentioned wash liquor that had been freed of ammonia and the mixture was heated to 80°–90° C. and treated with the regenerated ion exchange agent in amount such as to bring the liquor to a pH of 7. Methionine was then crystallized from the solution, as before. A total of five batches of the alkaline hydrolysis liquor were successively subjected to the series of operations described above. The average yield of crystalline dl-methionine from the five cycles of operation was approximately 96 per cent of theoretical and corresponded to 9.8 grams of methionine per 100 cc. of the hydrolysis liquor used as a starting material.

For comparative purposes, a separate portion of the above-mentioned hydrolysis liquor was neutralized at room temperature with hydrochloric acid and the methionine thus precipitated was filtered from the mixture. The yield of crystalline methionine was only 73 per cent of theoretical and corresponded to 7.45 grams of methionine per 100 cc. of the hydrolysis liquor.

*Example 2*

An aqueous hydrolysis liquor containing 0.374 gram molecular equivalent of the sodium salt of dl-alanine and also containing sodium hydroxide and sodium carbonate was added with stirring at room temperature to a mixture of 250 cc. of water and 950 grams of granular acidic cation exchange material of the kind employed in Example 1, thereby bringing the liquor to a pH value of 5. The mixture was filtered and the filtrate was concentrated nearly to the point of saturation by evaporation under vacuum. Methanol was then added until precipitation of alanine from the solution appeared to be complete. The crystalline alanine was removed by filtration. There was obtained 28.5 grams, or 85.5 per cent of the theoretical yield, of crystalline dl-alanine.

In a comparative experiment, a separate portion of the above-mentioned hydrolysis liquor, in amount containing 0.5 gram molecular equivalent of the sodium salt of dl-alanine, was evaporated under vacuum to a thick slurry. The sodium salt of alanine was extracted from the slurry with methanol and the extract was neutralized with acetic acid to precipitate the dl-alanine which was separated by filtration. The yield of crystalline dl-alanine was only 73 per cent of theoretical.

*Example 3*

Two experiments similar to those of Example 2 were carried out, except that the hydrolysis liquor used as a starting material contained a sodium salt of dl-alpha-aminobutyric acid instead of a salt of dl-alanine. In the experiment employing the cation exchange material, crystalline dl-alpha-aminobutyric acid was recovered in amount corresponding to 73.5 per cent of the theoretical yield. In the other experiment, the recovery of crystalline dl-alpha-aminobutyric acid was only 56.4 per cent of theoretical.

*Example 4*

Another pair of experiments similar to those of Example 2 were carried out, except that the amino acid salt present in the hydrolysis liquor used as a starting material was the sodium salt of dl-valine. In the experiment employing the cation exchange agent, crystalline dl-valine was recovered in a yield of 88.5 per cent of theoretical, based on the amount of the salt thereof present in the hydrolysis liquor subjected to treatment. In the other experiment, the yield of crystalline dl-valine was only 73.6 per cent of theoretical.

*Example 5*

An alkaline hydrolysis liquor containing approximately 0.2 gram molecular equivalent of the sodium salts of l-isoleucine and d-alloisoleucine was treated with a granular acidic cation exchange agent, similar to that employed in Example 1, the agent being added in amount such as to bring the liquor to a pH value of 7. The mixture was filtered and the filtrate was evaporated under vacuum until in the form of an aqueous amino acid slurry containing about 50 per cent by weight of the amino acid. The slurry was cooled to room temperature, diluted with from 3 to 4 times its volume of methanol, and the crystalline mixture of l-isoleucine and d-alloisoleucine was filtered therefrom. There was obtained 20.6 grams of the crystalline amino acid product. The product analyzed as containing 45 per cent by weight of l-isoleucine, the remainder being principally d-alloisoleucine.

*Example 6*

A mixture of 200 grams of water and 300 grams of a granular, acidic cation exchange agent, corresponding to that employed in Example 1, was heated to temperatures of from 90° to 95° C. and an aqueous sodium methionate solution (containing one gram molecular weight of the sodium salt of methionine, one molecular equivalent of sodium carbonate, and 0.5 molecular equivalent of sodium hydroxide per liter) was added with stirring until the liquor in contact with the ion exchange agent was brought to a pH value of 7.5. The ion exchange agent was removed by filtration, washed with 200 cc. of hot water, and the washings were added to the filtrate. The liquor was cooled to about room temperature to crystallize methionine which was separated by filtration. The ion exchange agent was regenerated, i. e. reconverted to its acidic form, by treatment with a dilute aqueous hydrochloric acid solution and washed with water. The mother liquor from the methionine crystallization was passed through a bed of the regenerated ion exchange agent and the effluent liquor was discarded. The ion exchange agent, which was partly converted to its methionine salt by absorption of methionine from said mother liquor, was re-employed as the cation exchange material in a step which otherwise corresponded to the first of the foregoing steps. Starting with the operation last mentioned, i. e. re-employment of the ion exchange material for treatment of a further amount of the alkaline sodium methionate solution, the cycle of operations just described was repeated a second and third time. In the second cycle of operations there was obtained 19.0 grams of crystalline methionine per 130 cc. of the alkaline aqueous sodium methionate starting liquor and in the third cycle of operations there was obtained 20.4 grams of crystalline methionine per 138 cc. of said starting liquor. The yields of crystalline methionine in these two cycles of operation corresponded to 98 per cent and 99 per cent, respectively, of that present in the starting liquors employed in said cycles.

A separate portion of the above-mentioned aqueous alkaline sodium methionate starting liquor was neutralized with hydrochloric acid to precipitate methionine therefrom and the precipitate was removed by filtration. Only 80.5 per cent of the methionine, present as a sodium salt in the starting liquor, was recovered in crystalline form.

Other modes of applying the principle of the invention may be applied instead of those explained, change being made as regards the method herein disclosed, provided the step or steps stated by any of the following claims or the equivalent of such stated step or steps be employed.

I therefore particularly point out and distinctly claim as my invention:

1. In a method for recovery of an aliphatic alpha-amino monocarboxylic acid from an alkaline aqueous solution of a metal salt of such amino acid, the steps of admixing with the solution an acidic cation exchange agent containing strongly acidic groups to form a slurry of said agent in the liquor, the agent being added in amount such as to bring the liquor to a pH value between 4.5 and 8.5, separating said agent from the liquor, and crystallizing the amino acid from the liquor.

2. A method, as described in claim 1, wherein the amino acid is one having a solubility in water of less than 4 per cent at 20° C. and of at least 5 per cent at 100° C. and wherein the neutral to alkaline amino acid salt solution is of a concentration corresponding to the presence of more than 4 per cent of the amino acid and is heated sufficiently to retain the amino acid in solution at the time when it is treated with the acidic cation exchange agent.

3. A method, as claimed in claim 1, wherein the amino acid is one capable of being dissolved in water at 20° C. to form a solution of more than 4 per cent concentration, the alkaline amino acid salt solution is of a concentration such that the amino acid is retained in solution when the liquor is treated with the acidic cation exchange agent, and wherein the amino acid is precipitated from the thus-treated liquor by diluting the latter with a water-miscible organic liquid in which the amino acid is substantially insoluble.

4. A method, as claimed in claim 3, wherein the amino acid is alanine.

5. A method, as claimed in claim 3, wherein the amino acid is an isomeric mixture of l-isoleucine and d-allo-isoleucine.

6. A method, as claimed in claim 3, wherein the amino acid is alpha-aminobutyric acid.

7. A method, as described in claim 1, wherein the cation exchange agent used for treatment of the neutral to alkaline amino acid salt solution is regenerated to its acidic form by treatment with an aqueous acid solution, and is contacted with the aqueous mother liquor from which the amino acid is crystallized, and is thereafter added to a further body of the alkaline amino salt solution in amount such as to bring the solution to a pH value between 4.5 and 8.5.

8. A method, as claimed in claim 7, wherein the amino acid is valine.

9. A method, as claimed in claim 7, wherein the amino acid is methionine.

10. A method, as claimed in claim 1, wherein the alkaline amino acid salt solution is treated with the acidic cation exchange agent in amount bringing the liquor to a pH value of from 7 to 8.

11. A continuous method for the recovery of an aliphatic alpha-amino monocarboxylic acid from an alkaline aqueous solution of a salt of the same, which comprises passing the solution into admixture with an ion exchange material of the group consisting of acidic cation exchange agents containing strongly acidic groups and amino acid salts of such agents to form a slurry of the ion exchange material in the liquor, the ion exchange material being admixed with the solution in a proportion such as to bring the solution to a pH value between 4.5 and 8.5, separating the resultant amino acid solution and the ion exchange material, passing the ion exchange material through a zone where it is regenerated to its acidic form by treatment with an aqueous acid solution while at the same time crystallizing the amino acid from said amino acid solution, admixing mother liquor from the crystallization with the regenerated ion exchange material and recycling the latter to the first of the above-stated steps.

12. A method, as claimed in claim 11, wherein the amino acid is methionine.

References Cited in the file of this patent

UNITED STATES PATENTS

| | | |
|---|---|---|
| 2,085,784 | Bottoms | July 6, 1937 |
| 2,206,007 | Liebknecht | June 25, 1940 |
| 2,301,609 | Richter | Nov. 10, 1942 |
| 2,341,907 | Cheetham et al. | Feb. 15, 1944 |
| 2,375,165 | Nees et al. | May 1, 1945 |
| 2,386,926 | Block | Oct. 16, 1945 |
| 2,388,222 | Behrman | Oct. 30, 1945 |
| 2,413,791 | Shafor | Jan. 7, 1947 |
| 2,510,980 | Jacobs et al. | June 13, 1950 |
| 2,528,047 | Fitch | Oct. 31, 1950 |
| 2,556,907 | Emmick | June 12, 1951 |

OTHER REFERENCES

Folin: J. Biol. Chem., vol. 51, page 393 (1922).

Schwartz et al.: Ind. & Eng. Chem., vol. 32, pp. 1462–65 (1940).

Elving et al.: Proc. Indiana Acad. Science for 1941, pp. 136–139 (published June 1942).

Nachod: "Ion Exchange" (Academic Press), pp. 3, 175 and 298 (1949).

Kunin et al.: Ion Exchange Resins" (Wiley), pp. 64, 66–69, 124–5 (1950).